United States Patent
Levy et al.

(10) Patent No.: US 10,361,988 B2
(45) Date of Patent: Jul. 23, 2019

(54) COMPUTING DEVICE FOR IMPROVING CONTENT SHARING

(71) Applicant: Microsoft Technology Licensing, LLC, Redmond, WA (US)

(72) Inventors: Jordan Levy, San Francisco, CA (US); Arin Sarkissian, San Mateo, CA (US); Wayne Pan, San Jose, CA (US); Hojeong Kim, Belmont, CA (US); Rebeca Sermer, San Jose, CA (US); Zoe Diamadi, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 15/231,585

(22) Filed: Aug. 8, 2016

(65) Prior Publication Data
US 2018/0006991 A1   Jan. 4, 2018

(30) Foreign Application Priority Data
Jun. 29, 2016 (GR) .............................. 20160100352

(51) Int. Cl.
*G06F 15/16* (2006.01)
*H04L 12/58* (2006.01)
*H04L 29/08* (2006.01)

(52) U.S. Cl.
CPC .............. *H04L 51/32* (2013.01); *H04L 67/02* (2013.01); *H04L 67/1097* (2013.01); *H04L 67/306* (2013.01)

(58) Field of Classification Search
CPC ........ H04L 67/02; H04L 67/306; H04L 51/32
See application file for complete search history.

(56) References Cited

U.S. PATENT DOCUMENTS

| | | | | |
|---|---|---|---|---|
| 2006/0089868 | A1* | 4/2006 | Griller | G06Q 10/06 705/7.39 |
| 2010/0250463 | A1* | 9/2010 | O'Rourke | G06F 17/30867 705/347 |

* cited by examiner

*Primary Examiner* — Yves Dalencourt
(74) *Attorney, Agent, or Firm* — Schwegman Lundberg & Woessner, P.A.

(57) ABSTRACT

Disclosed in some examples, are methods, systems (a "performance system"), and machine readable mediums which provide information about an organization's performance in the hierarchical content distribution system using one or more Graphical User Interfaces (GUI)s. The system produces and displays a health score which quantifies the performance of the organization's outreach efforts through the hierarchical content distribution network. The health score may be created based upon a plurality of subscores.

18 Claims, 8 Drawing Sheets

| COMPANY | PERCENTILE RANKING | EHI SCORE | ORG. EFFECTIVENESS | CONTENT EFFECTIVENESS | EMPLOYEE EFFECTIVENESS |
|---|---|---|---|---|---|
| BIG BANK CO. | 47 | 66 | 88 | 62 | 33 |
| CHARGE CARD CO. | 7 | 56 | 52 | 59 | 59 |
| ELIZABETH PRODS. | 76 | 72 | 78 | 74 | 57 |
| GRACE STUDIOS | 94 | 78 | 84 | 81 | 60 |
| JULIA ENTERTAIN | 80 | 73 | 84 | 74 | 51 |
| KALWEIT INDUSTRIES | 21 | 61 | 49 | 78 | 52 |
| ... | | | | | |
| OWEN MEDIA COM | 87 | 75 | 93 | 71 | 47 |
| VANDERLAY IND. | 32 | 64 | 71 | 66 | 43 |

*FIG. 4*

METRIC PERFORMANCE: EMPLOYEE EFFECTIVENESS — 5000

| MEASUREMENT NAME — 5010 | MEASUREMENT STATUS — 5020 | ACTION ITEMS — 5030 |
|---|---|---|
| % OF USERS ACTIVE THIS WEEK | WEEKLY ACTIVE USER RATE UNDERPERFORMING PEERS | VIEW DEEP DIVE TO (1) PROVIDE INSIGHTS ON USAGE PATTERNS (2) UNDERSTAND ACROSS WHICH PLATFORMS USERS ARE MORE ACTIVE |
| % OF ACTIVE USERS REMAINING ACTIVE WOW | ACTIVE USER RATE DECLINING FASTER VS. PEERS | 1.) VIEW DEEP-DIVE TO SEE UNDERPERFORMANCE VS. PEERS 2.) RECOMMEND TARGETED OUTREACH TO ACTIVE USER POPULATION |
| % OF USERS "AT RISK" (INACTIVE FOR 15-42 DAYS) | USERS AT RISK OF BECOMING DORMANT AT HIGHER LEVELS VS. PEERS | 1.) VIEW DEEP-DIVE TO SEE UNDERPERFORMANCE VS. PEERS 2.) RECOMMEND TARGETED OUTREACH TO AT RISK USER POPULATION |
| % OF USERS DORMANT (INACTIVE FOR 42+ DAYS) | USERS BECOMING DORMANT AT HIGHER LEVELS VS PEERS | 1.) VIEW DEEP-DIVE TO SEE UNDERPERFORMANCE VS. PEERS 2.) RECOMMEND PERSONALIZED OUTREACH TO DORMANT USERS |
| % OF "AT RISK" OR "DORMANT" USERS REACTIVATING | USERS REACTIVATING AT SLOWER RATES THAN PEERS | 1.) VIEW DEEP-DIVE TO SEE UNDERPERFORMANCE VS. PEERS |

*FIG. 5*

COMPUTING DEVICE FOR IMPROVING CONTENT SHARING

CLAIM OF PRIORITY

This patent application claims the benefit of priority, under 35 U.S.C. Section 119 to Greek Patent Application 20160100352, filed on Jun. 29, 2016, which is hereby incorporated by reference herein in its entirety.

TECHNICAL FIELD

Embodiments pertain to improved computing devices. Some embodiments relate to improved computing devices for improving content sharing.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 is a GUI showing a list of organizations, their EHI percentile ranking, the EHI scores, the organizational effectiveness, the content effectiveness and employee effectiveness subscores according to some examples of the present disclosure.

FIG. 5 is a detailed view GUI according to some examples of the present disclosure.

DETAILED DESCRIPTION

Figure 1:
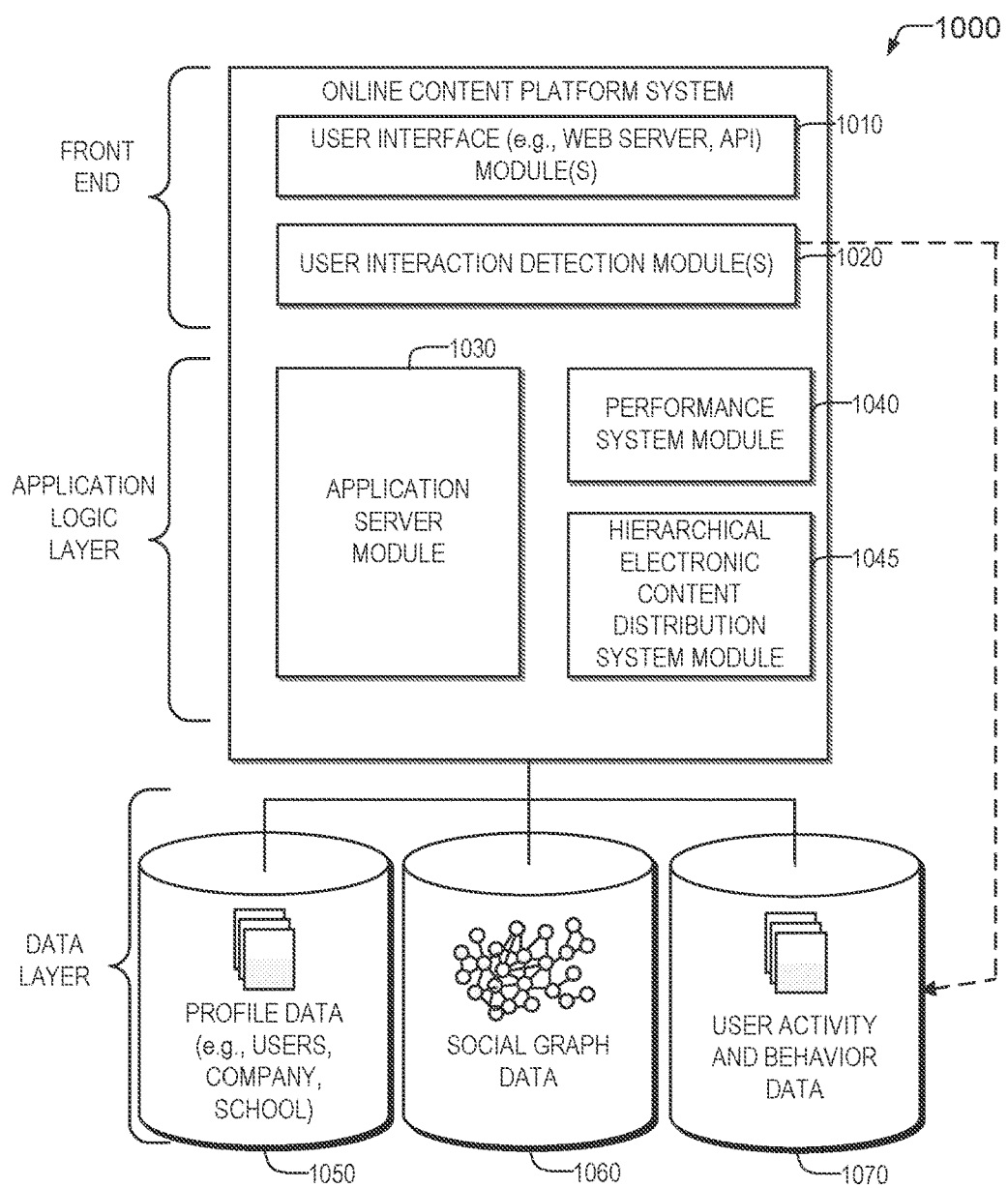
FIG. 1 is a block diagram showing the functional components of a social networking service according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. The present inventive subject matter is generally applicable to a wide range of information services.

A social networking service is a service provided by one or more computer systems accessible over a network that allows members of the service to build or reflect social networks or social relations among members. Typically, members construct profiles, which may include personal information such as the member's name, contact information, employment information, photographs, personal messages, status information, multimedia, links to web-related content, blogs, and so on. In order to build or reflect these social networks or social relations among members, the social networking service allows members to identify, and establish links or connections with other members. For instance, in the context of a business networking service (a type of social networking service), a member may establish a link or connection with his or her business contacts, including work colleagues, clients, customers, personal contacts, and so on. With a social networking service, a member may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of, business networking purposes; and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or otherwise corresponds to an information access privilege, such that a first member who has established a connection with a second member is, via the establishment of that connection, authorizing the second member to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or "following" process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other connection-based social networking services also may allow following-type relationships as well. For example, the social networking service LinkedIn® allows members to follow particular companies.

Members may be people or organizations (such as companies). Organizations may create profiles that may be visible to other members and may contain information about the organization, news, messages, and other communications from the organization and the like. Members may follow or connect with these organizations in the same way as they do other members. These organizational pages feature information about the organization and can serve as a powerful recruiting, marketing, and sales tool. An organization may recruit talent, generate interest in products, deliver news, and engage in other forms of advertising and marketing. While these pages offer a great way for an organization to accomplish its objectives, an organization's reach is limited to those who follow the company or who view the organization's profile page.

Individuals associated with the organization (e.g., employees of a company) offer untapped potential in reaching a larger audience. For example, the aggregate of all the connections of a company's employees are more numerous than just the followers of an organization. Individuals associated with the organization (such as employees) may have interests and goals aligned with those of the organization. Moreover, employees' connections may have similar goals and interests. As a consequence, employees' social connections may be a highly interested group that is receptive to the company's message.

In some examples, a social networking service may leverage these connections by utilizing a hierarchical electronic content distribution system to distribute content to a wider audience. In some examples, an individual associated with the organization (the content origin) may select an item of content and may select other individuals to share the content with. The selected individuals may be connections of the content origin and may or may not be associated with the organization. The individuals with whom the content origin shared the content may then share the content with some of their connections (both inside and outside the organization), and these connections may share the content with their connections (both inside and outside the organization), and so on.

In this way a hierarchical content distribution network may be created that is rooted at an organizational level, such as a company, and may utilize the connections of individuals associated with the organization, such as employees, their connections, and in some examples their connections' connections and so on in an effort to expand the company's influence.

In some examples, the content origin may be an employee of the organization whose job responsibilities include curating content (a curator) for sharing in order to activate other employees to spread the company's message. In other examples, the content origin may be other employees.

The hierarchical content distribution network may be specific to each item of content. This is because each item of content may be shared with different associates, and those associates may share each item of content with different connections of theirs, and so on. Structurally, a hierarchical content distribution network may be described by a graph data structure (e.g., a tree) which is referred to herein for convenience of description as a content distribution graph. In this content distribution graph the top-level node in the graph represents the origin of the content. Nodes on the second-level represent members who are selected to receive the content by the top level node—e.g., selected employees. Third level nodes represent selected connections of second level nodes, and so on.

Nodes in the graph may represent people or other organizations. Nodes may be members of the "host" social networking service—that is, the social networking service which creates and manages the hierarchical content distribution network, or members of another social networking service. Each hierarchical content distribution network corresponds to an item of content, and each hierarchical content distribution network may be content specific, as each member of the hierarchical content distribution network may choose different connections to share different content with. In some examples, multiple hierarchical content distribution networks may exist for a single item of content if that item of content was shared initially by multiple content origins. In other examples, a single hierarchical content distribution network may exist for an item of content; if that item of content is shared by multiple origins, the content distribution graph may have multiple top-level nodes and may represent a merged graph of the path the content has taken through both organizations.

Each time a member shares an item of content with another member, a node may be added to the content distribution graph of that item of content. The nodes in the graph may store information on the members in the hierarchical content distribution graph. Such information may include one or more of an identifier of the member that is represented by the node, a link to the member's profile, a list of any interactions with the content, links to nodes that shared the content with this node and links to nodes that this node shared content with.

The recipient of the shared content may be notified via a notification, such as an email, a post to a news feed, a post on the member's profile, a mobile notification, or the like. Each recipient may "interact" with the content such as by opening, clicking, reading, commenting on, or sharing the content. Sharing and interacting with the content may be accomplished via a user interface provided by the social networking service (either the host social networking service, or another social networking service), or through other applications (that may be programmatically linked through an Application Programming Interface (API) to the social networking service).

Members of the hierarchical content distribution network may utilize one or more graphical user interfaces to participate in the hierarchical content distribution network that may be collectively referred to herein as a content sharing interface. The content sharing interfaces may be the same for each level in the hierarchy, or they may be different depending on the level (e.g., the interface presented to members at the first-level may be the same as, or different than, that presented to the second-level, and so on). These content sharing interfaces may be provided by the social networking service, a network based service, by one or more other applications, or a combination of both. Content sharing interfaces may provide for the sharing of content, but may also provide for interactions by members with the content, including for example, clicking on the content, marking the content as a favorite, liking the content, commenting on the content, highlighting portions of the content, copying, pasting, or reading the content. In some examples, when sharing the content, individuals may include additional content such as comments, additions, photos, videos, sound clips, podcasts, and the like. These changes may be recorded in the content distribution graph. In some examples, the content sharing interfaces may be integrated into the social networking service—such as part of a member profile page.

The content sharing interface for each node may programmatically associate through one or more Application Programming Interfaces with other social networking services to present an individual with connections outside the host social networking service with which the content may be shared. Thus, each node in the content distribution graph may represent a member of the host social networking service (the social networking service providing the content distribution hierarchy) or may represent a member of a different social networking service.

The hierarchical electronic content distribution system may allow for the creation of channels. Channels are groups of one or more members (e.g., employees) that focus on sharing content that is of a particular subject matter. Members may publish one or more content shares to all the members who subscribe to a particular channel. In some examples, the curator may publish certain content to certain channels.

In some examples, the host social networking service may track the movement, changes, and interactions with content through the hierarchical content distribution network. For example, the content sharing interfaces may record in the content distribution graph which individuals have shared content, which individuals have interacted with the content, and the type of those interactions. For example, the system may track one or more content interactions such as: clicks of the content, re-shares of the content (e.g., when a connection re-shares the content with someone else), replies to the content, comments associated with the content, likes of the content, any tagging of the content (e.g., tagging the content as a "favorite"), and the like. The content interactions may be collected for any individuals, and the system may store an indication as to which individuals performed which interactions. These interactions may be collected through the content sharing interfaces, or through one or more other applications that are programmatically linked using an API to the social networking service.

The system may aggregate these interactions to produce one or more measurements. For example, the number of interactions, number of interactions broken down by type, the number of shares, number of clicks, number of views, number of tags, the engagements with the content, and the like. The measurements may be a total for all individuals, or may be broken down based upon hierarchy level (e.g., how many second level node shares, how many third level shares, and the like.) These measurements may be presented to other individuals, such as the individuals represented by the first-level nodes (e.g., organizational decision makers). Other measurements may include reach—the total network size of all individuals who could have seen a share; and a share rate—the percentage of employees of an organization who choose to share a broadcast with their networks. Various other measurements may also be tracked and calculated as will be described later.

While the hierarchical content distribution system may be beneficial to enhance the organization's visibility, an organization may not know whether it is successful in that goal. Furthermore, if they are not successful, it may be difficult to determine why they are not successful. Disclosed in some examples, are methods, systems (a "performance system"), and machine readable mediums which provide information about an organization's performance in the hierarchical content distribution system using one or more Graphical User Interfaces (GUI)s. The system produces and displays a health score which quantifies the performance of the organization's outreach efforts through the hierarchical content distribution network. The health score may be created based upon a plurality of subscores. In some examples, the health score may be calculated on the basis of one or more of: organizational effectiveness (e.g., the impact of company actions—such as the volume of content shared by the administrator), content effectiveness (e.g., the content quality), and employee effectiveness (e.g., how engaged their employees are) subscores. These subscores may be based upon one or more measurements of the organization's usage of the hierarchical electronic content distribution system. The system may create one or more GUIs to display the overall health score, the sub scores, or the various measurements that produced the individual subscore. Users may compare scores, subscores, or measurements of an organization to other similar organizations. Similar organizations may be defined as other organizations in an industry, other organizations in a particular location, other organizations of a particular size, or the like. Additionally the system may provide one or more suggestions to increase a subscore that is below a desired level. A user may include an administrator of the hierarchical content distribution system, a member of the organization, and the like.

In some examples, the performance system calculates an overall health score (also referred to herein as an EHI score) that is indicative of the overall performance of the organization's success in using the hierarchical content distribution system. In some examples, this may be a numerical score between 1-100. In other examples, other score ranges may be utilized, such as a percentile ranking, a percentage, a numerical score between two predetermined numbers, and the like. As noted, the score may be calculated based upon one or more subscores. For example, the overall health score may be a weighted sum of the one or more sub scores. The weightings may be predetermined by an administrator of the performance system. In some examples, the overall health score may be a weighted sum of organizational effectiveness, content effectiveness, and employee effectiveness subscores. In some examples, the weights are all '1', thus the overall health score is a sum of the subscores. In other examples, the weights for each subscore may be the same, but in other examples each subscore may be weighted differently. In still other examples, the weights may be 0.40 for organizational effectiveness, 0.40 for content effectiveness and 0.20 for employee effectiveness.

In some examples, each subscore may be calculated using information gathered about the organization's use of the hierarchical content distribution network. For example, the organizational effectiveness subscore may be calculated based upon a number of measurements. Example measurements that determine the organizational effectiveness subscore includes one or more of: a broadcast volume measurement, a week-over-week (WoW) broadcast volume, the percentage of employees that are sent at least a target amount of content to share by the organization within a predetermined period of time, a WoW percentage of employees that are sent at least a target amount of content to share by the organization within a predetermined period of time, a percentage of users to whom the organization has directed no content for sharing during a particular timeframe, a WoW comparison of the percentage of users to whom the organization has directed no content for sharing, and the like.

A broadcast volume measurement for a predetermined period of time (e.g., the last 7 days) measures how much content was made available through the hierarchical content distribution network by the organization to employees during that time period. A week-over-week (WoW) broadcast volume measures this week's broadcast volume as compared to last week's broadcast volume. The percentage of employees that are sent at least a target amount of content to share by the organization within a predetermined number of time and the percentage of users to whom the organization has directed no content for sharing during a particular week measure the distribution of the content across employees. For example, content may be directed to individual users or groups of users through channels. If only a portion of those groups are receiving content, it is a sign that the curator should make an effort to select and send content to other groups or users. These measurements also have a related WoW measurement which measures weekly change in these measurements.

One or more (or all) of these measurements may be combined to create an organizational effectiveness subscore. Each of these measurements may have an associated target measurement used to determine a component of the subscore. Target measurements may be determined by an administrator of the performance system or may be determined using measurements of one or more organizations participating in the hierarchical content distribution network. For example, the target measurement may be based upon an average measurement of all organizations using the hierarchical content distribution system, all organizations using the hierarchical content distribution system of a similar size (e.g., within a predetermined percentage of employees), all organizations using the hierarchical content distribution system in the same industry, organizations or the like. In some examples, the target measurements may change over time. This allows for variances in the measurements due to external factors (e.g., holidays, industry events, and the like).

In some examples, the organizational effectiveness subscore may be a weighted sum of a plurality of measurement components. Each measurement component may itself be a weighted sum of the measurement and its corresponding WoW counterpart. For example, the organizational effectiveness subscore may be computed as:

$$\begin{aligned}
\text{Organizational Effectiveness} = \\
(oe\_w_1(oe\_w_2(\text{total volume} - \text{target volume}) + \\
oe\_w_3(\text{volume change } WoW - \text{target volume change } WoW)) + \\
oe\_w_4(oe\_w_5(\% \text{ users receiving enough content} - \\
\text{target \% of users receiving enough content}) + \\
oe\_w_6(\% \text{ users receiving enough content } WoW - \\
\text{target \% of users receiving enough content } WoW)) + \\
oe\_w_7(oe\_w_8(\text{target \% of users with no content} - \\
\% \text{ of users with no content}) + \\
oe\_w_9(\text{target \% of users with no content } WoW - \\
\% \text{ of users with no content } WoW))
\end{aligned}$$

Where each $oe\_w_i$ is a weighting and each corresponding pair of oe_w weights (e.g., [oe_w2, oe_w3], [oe_w5, oe_w6], [oe_w8, oe_w9]) reflect a relative importance of each WoW measurement with respect to the non-WoW measurement (e.g., the current week's measurement). The weights that reflect the relative importance of each WoW measurement with respect to the non-WoW measurement in some examples may add up to be 1. In some examples, the regular measurement may be weighted as 0.7 (e.g., oe_w2, oe_w5, and oe_w8) whereas the corresponding WoW may be weighted as 0.3 (e.g., oe_w3, oe_w6, and oe_w9). The other weightings (oe_w1, oe_w4, and oe_w7) reflect the relative importance of the standard measurement (e.g., non WoW measurement), WoW measurement pair with respect to other measurement pairs.

One or more measurements may be utilized to calculate the content effectiveness subscore of the overall organization's health score. Example measurements may include one or more of (or all of): the percentage of active employees who shared content in the past predetermined period of time (e.g., last week), the average share rate (e.g., the number of shares per viewed message vs. a share's per broadcast metric) over a predetermined period of time, average number of engagements per share in the past predetermined period of time (e.g., the last week), the ratio of viral engagements to total engagements per share in the past predetermined period of time, and the like. Furthermore, measurements used to calculate the content effectiveness component may also include WoW versions of the measurements (e.g., WoW change in percent active employees sharing content, WoW change in the share rate, and the like).

The percentage of employees who shared content indicates how active the organization's employees are at sharing content. Rather than use the number of content shares, this measurement allows for differentiating the case where the content shares of the organization are the result of a few prolific sharers or, rather, a broad base of employees. Note that the social networking service may determine who is an employee of an organization and the total numbers of employees in a number of ways. For example, those members of the social networking service that report as working at the organization. In other examples, organizations may supply lists and contact information of the employees that may then be matched with profiles (or profiles may be automatically created for the user) on the social networking service.

The average share rate is an indicator of overall content quality. The average number of engagements is similar to the average share rate, but measures other interactions, such as liking, re-sharing, commenting, reading, printing, and other interactions and is also an indicator of quality of content. Content that is shared or interacted with frequently is assumed to be good content. Furthermore, by utilizing an average share and interaction rates, the influence of one or two viral shares that result in numerous shares and interactions may be reduced to a degree. This results in a more accurate picture of the overall content quality. A viral engagement is any "social action". Social actions are likes, comments, and reshares. Total engagements are clicks and social actions. Thus, the ratio of viral engagement to total engagements is thus equal to the number of social actions/(the number of clicks+the number of social actions)

The content effectiveness score may be calculated by calculating a weighted sum of the difference between one or more of the measurements previously described to one or more target measurements. Target measurements may be determined by an administrator of the performance system or may be determined using measurements of one or more organizations participating in the hierarchical content distribution network. For example, all organizations using the hierarchical content distribution system, all organizations using the hierarchical content distribution system of a similar size (e.g., within a predetermined percentage of employees), all organizations using the hierarchical content distribution system in the same industry, or the like. As before, each measurement may have an associated WoW target and measurement and the normal measurement and the WoW variant may be individually weighted and combined.

An example content effectiveness score may be:

$$\begin{aligned}
\text{Content Effectiveness} = {} & (ce\_w_1 \\
& (ce\_w_2(\% \text{ of active employees that shared content} - \text{target }\%) + \\
& ce\_w_3(\% \text{ of active employees that shared content } WoW - \\
& \qquad \text{target } WoW)) + \\
& ce\_w_4(ce\_w_5(\text{average share rate} - \text{target share rate}) + \\
& ce\_w_6(\text{average share rate } WoW - \text{target share rate } WoW)) + \\
& ce\_w_7(ce\_w_8(Avg \text{ Engagements Per Share} - \text{target } eng. \text{ per share}) + \\
& ce\_w_9(Avg \text{ Engagements Per Share } WoW - \\
& \qquad \text{target } eng. \text{ per share } WoW)) + ce\_w_{10} \\
& (ce\_w_{11}(\text{Ratio of Viral Engagements to Total Engagements} - \\
& \qquad \text{Target Ratio}) + ce\_w_{12}(\text{Ratio of Viral Engagements} \\
& \qquad \text{to Total Engagements } WoW - \text{Target Ratio } WoW))
\end{aligned}$$

Where each $ce\_w_i$ is a weighting and each corresponding pair of ce_w weights (e.g., [ce_w2, ce_w3], [ce_w5, ce_w6], [ce_w8, ce_w9], [ce_w11, ce_w12]) reflect a relative importance of each WoW measurement with respect to the non-WoW measurement (e.g., the current week's measurement). The weights that reflect the relative importance of each WoW measurement with respect to the non-WoW measurement in some examples may add up to be 1. In some examples, the regular measurement may be weighted as 0.7 (e.g., w2, w5, w8, w11) whereas the corresponding WoW may be weighted as 0.3 (e.g., w3, w6, and w9, w12). The other weightings (ce_w1, ce_w4, ce_w7, and ce_w10) reflect the relative importance of the standard measurement, WoW measurement pair with respect to other measurement pairs.

One or more measurements may be utilized to calculate the employee effectiveness score. Example measurements may include one or more of: percentage of employees who visit a GUI of the hierarchical content distribution system over a predetermined period of time, WoW percentage of employees who visit the hierarchical content distribution system over a predetermined period of time, percentage of active users moving to "at risk" status (e.g., the percentage of users who were once active and who have not visited the hierarchical content distribution system in a predetermined period of time—e.g., 14-27 days), WoW percentage of active users moving to "at risk" status, percentage of at-risk users moving to dormant status (dormant users are users who have not visited the hierarchical content distribution system in over a second predetermined period of time—e.g., 28+ days), WoW percentage of at-risk users moving to dormant status, the percentage of "at risk" or "dormant" users returning to active status and WoW change in percentage of "at risk" or "dormant" users returning to active status. Each of these measurements may have an associated target measurement that may be created by an administrator of the organization, an administrator of the system, or based upon an average measurement for all organizations, organizations in the same industry, organizations in the same geographical region, and the like. In one example, the employee engagement subscore may be calculated as:

$$\begin{aligned}
\text{Employee Effectiveness} = {} & \\
& (ee\_w_1(ee_{w2}(\% \text{ of employees that visit} - \text{target }\%) + \\
& ee_{w3}(\% \text{ of employees that visit} - \text{target } WoW)) + \\
& ee_{w4}(ee_{w5}(\% \text{ of users moving to at risk} - \text{target at risk rate}) + \\
& ee_{w6}(\% \text{ of users moving to at risk } WoW - \\
& \qquad \text{target users moving to at risk } WoW)) + \\
& ee_{w7}(ee_{w8}(\% \text{ of at risk moving to dormant} - \\
& \qquad \text{target }\% \text{ of at risk moving to dormant}) + \\
& ee_{w9}(\% \text{ of at risk moving to dormant } WoW - \\
& \qquad \text{target }\% \text{ of at risk moving to dormant } WoW)) + \\
& (ee\_w_{10}(ee\_w_{11}(\% \text{ of at risk or dormant to active} - \text{target }\%) + \\
& ee\_w_{12}(\% \text{ of at risk or dormant to active} - \text{target } WoW))
\end{aligned}$$

Where each $ee\_w_i$ is a weighting and each corresponding pair of ee_w weights (e.g., [ee_w2, ee_w3], [ee_w5, ee_w6], [ee_w8, ee_w9]) reflect a relative importance of each WoW measurement with respect to the non-WoW measurement (e.g., the current week's measurement). The weights that reflect the relative importance of each WoW measurement with respect to the non-WoW measurement in some examples may add up to be 1. In some examples, the regular measurement may be weighted as 0.7 (e.g., ee_w2, ee_w5, wee_8) whereas the corresponding WoW may be weighted as 0.3 (e.g., ee_w3, ee_w6, and ee_w9). The other weightings (ee_w1, ee_w4, ee_w7) reflect the relative importance of the standard measurement, WoW measurement pair with respect to other measurement pairs.

In some examples, the overall health score may be given as:

Health Score=$w_1$*organizational effectiveness subscore+$w_2$*content effectiveness subscore+$w_3$*employee engagement subscore Where each $w_i$ reflects a relative importance of each subscore relative to the other subscores. In some examples, $w_1$ is 0.20, $w_2$ is 0.40 and $w_3$ is 0.40.

Based upon the overall health score and the subscores, an organization's scores may be compared with other a group of other organizations. The group of organizations may be selected based upon one or more criteria such as: organizations in a particular industry, organizations in a particular geographic area, organizations of a particular size, and the like. Based upon the particular comparison, the system may provide one or more recommendations to improve organizational performance. Examples include increasing the volume of communications sent to employees from the organization to boost organizational effectiveness, finding and sending more contact to different channels, contacting users to encourage them to be more engaged, changing the types of content sent, driving more mobile adoption to increase usage, changing the curator mix to improve relevancy and content quality, adding new sources of external content to improve content liquidity, and the like.

FIG. 1 is a block diagram showing the functional components of a social networking service 1000. As shown in FIG. 1, a front end module may comprise a user interface module (e.g., a web server) 1010, which receives requests from various client-computing devices, and communicates appropriate responses to the requesting client devices. For example, the user interface module(s) 1010 may receive requests in the form of Hypertext Transport Protocol (HTTP) requests, or other network-based, application programming interface (API) requests (e.g., from a dedicated social networking service application running on a client device). In addition, a user interaction and detection module 1020 may be provided to detect various interactions that users (e.g., members) have with different applications, services and content presented. As shown in FIG. 1, upon detecting a particular interaction, the user interaction and detection module 1020 logs the interaction, including the type of interaction and any meta-data relating to the interaction, in the member activity and behavior database 1070.

An application logic layer may include one or more various application server modules 1030, which, in conjunction with the user interface module(s) 1010, generate various graphical user interfaces (e.g., web pages) with data retrieved from various data sources in the data layer. With some embodiments, application server module 1030 is used to implement the functionality associated with various applications and/or services provided by the social networking service as discussed above.

Application logic layer may also include performance system module 1040 and hierarchical electronic content distribution system module 1045. Hierarchical electronic content distribution system module 1045 may implement the hierarchical electronic content distribution system as previously described and may provide one or more content sharing interfaces to users by working with user interface module 1010. Performance system module 1040 may work with hierarchical electronic content distribution system module 1045, user interface module(s) 1010, as well as databases 1050-1070 to calculate and provide to users one or more measurements, subscores, healthscores, and organizational comparisons that describe one or more organizations' usage of and performance in the hierarchical electronic content distribution system. The performance system module 1040 is described in more detail in FIG. 2.

A data layer may include several databases, such as a database 1050 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 1050. Similarly, when a representative of an organization initially registers the organization with the social networking service, the representative may be prompted to provide certain information about the organization. This information may be stored, for example, in the database 1050, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Figure 3:
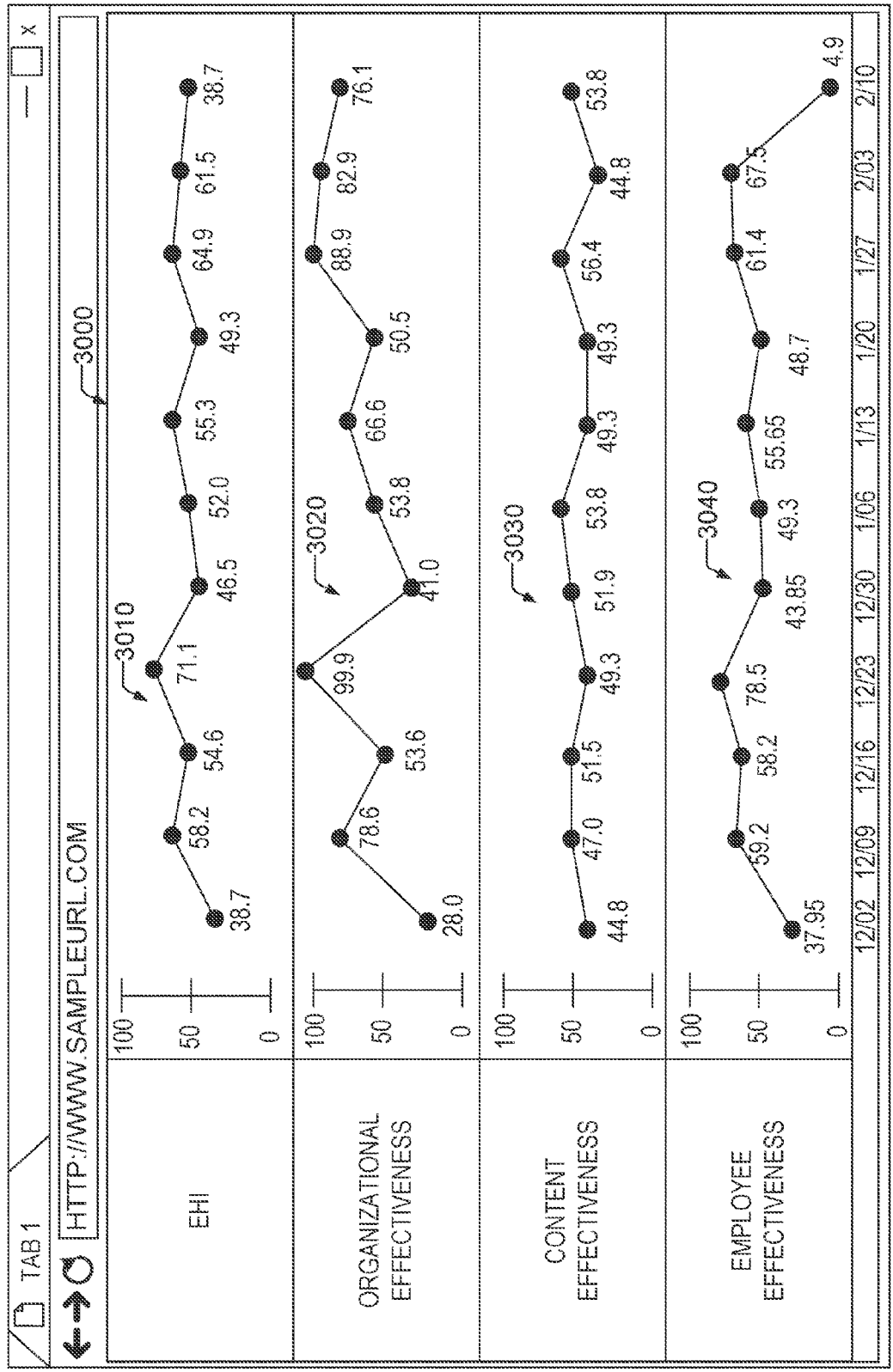
FIG. 3 is a GUI showing an organization's Elevate Health Index (EHI) and subscores plotted against time according to some examples of the present disclosure.

Information describing the various associations and relationships, such as connections that the members establish with other members, or with other entities and objects, is stored and maintained within a social graph in the social graph database 1060. Also, as members interact with the various applications, services, and content made available via the social networking service, the members' interactions and behavior (e.g., content viewed, links or buttons selected, messages responded to, etc.) may be tracked and information concerning the member's activities and behavior may be logged or stored, for example, as indicated in FIG. 3 by the member activity and behavior database 1070.

With some embodiments, the social networking service 1000 provides an application programming interface (API) module with the user interface module 1010 via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Figure 2:
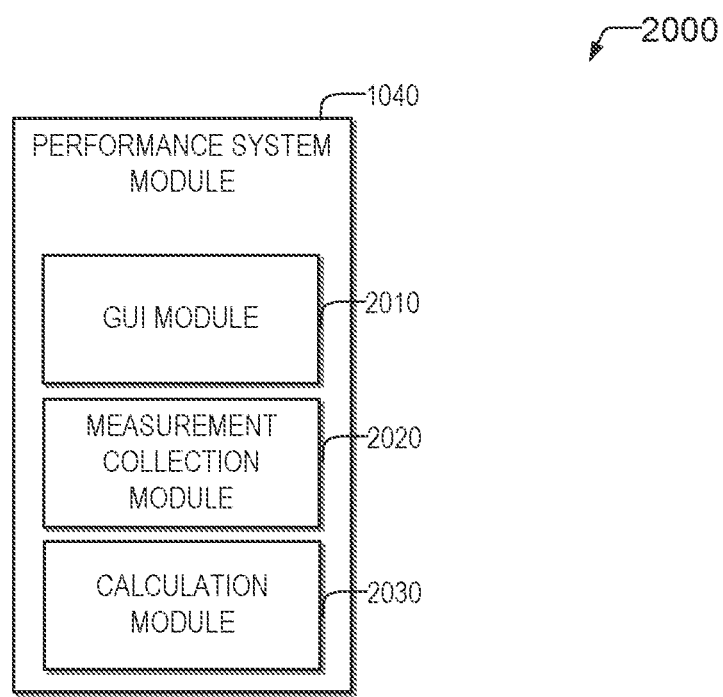
FIG. 2 is a block diagram of the performance system module according to some examples of the present disclosure.

Turning now to FIG. 2 a block diagram of the performance system module 1040 of FIG. 1 is shown according to some examples of the present disclosure. GUI module 2010 provides one or more GUIs in association with user interface module 1010 of FIG. 1. GUI module provides GUIs such as those shown in FIG. 3-6. Additional GUIs may be provided by GUI module in addition to, or other than those in FIGS. 3-6. GUIs may provide one or more overall health scores (EHI) scores of one or more organizations, EHI percentiles of one or more organizations, organizational effectiveness scores of one or more organizations, content effectiveness scores of one or more organizations, employee effectiveness scores of one or more organizations, one or more measurements for the subscores, action items for one or more organizations to improve one or more measurements, specific users of the organization to contact, and the like.

These GUIs may be created and provided to one or more users in a number of ways. In some examples, users download or otherwise install one or more dedicated applications on their computing devices. These applications may provide one or more GUIs that may utilize information provided by the performance system module. In other examples, the performance system module may create and provide to the user's computing device one or more GUI descriptors. GUI descriptors may be interpreted by a general purpose application executing on the user's computing device. The GUI descriptors may instruct the general purpose application (e.g., a browser) in rendering one or more GUIs. Example GUI descriptors may include one or more of HyperText Markup Language (HTML) documents, eXtensible Markup Language (XML) documents, Content Style Sheets (CSS), JavaScript documents, and the like.

Measurement collection module 2020 may collect the various measurements utilized by calculation module 2030 to calculate the various sub scores and the EHI score. Measurements include week-over-week measurements and standard measurements as previously described. Calculation module 2030 utilizes one or more of the measurements collected by measurement collection module 2020 to calculate one or more subscores and an EHI score. Calculation module 2030 may also calculate one or more target values based upon one or more groups of organizations. For example, target values may be an average value of a measurement for the group of organizations.

Turning now to FIG. 3, a GUI 3000 showing an organization's EHI and sub scores plotted against time is shown according to some examples of the present disclosure. The GUI shows the EHI score trendline 3010, the organizational effectiveness subscore trendline 3020, the content effectiveness subscore trendline 3030, and the employee effectiveness subscore trendline 3040 over several months with weekly data points. This view allows users to view performance by the organization over a number of months to spot trends in the performance.

Turning now to FIG. 4, a GUI 4000 showing a list of organizations, their EHI percentile ranking (as compared to other organizations in the list), the EHI scores, the organizational effectiveness, the content effectiveness and employee effectiveness subscores according to some examples of the present disclosure. The organizations in the list may be all organizations participating in the hierarchical electronic content distribution system, or may be a subset of the organizations participating in the hierarchical electronic content distribution system. For example, the subset may be selected based upon one or more of: geographic location, industry, size (e.g., number of employees, revenue, and the like), user selection (e.g., companies selected by a user), and the like. In these examples, the percentile may be calculated based upon the subset in the list. Thus, the percentile may be for a particular industry, location, size, user selected list and the like. The subset may be changed or modified by the user by inputting into the GUI criteria for selecting the subset. For example, the user may enter one or more of: the geographic location (e.g., a location and a radius), industry, size, specific organizations, and the like. Based upon these criteria, a subset may be determined and percentiles may be calculated.

As shown in FIG. 4, the GUI comprises a table structure with a row for each organization in the subset of organizations. The company name 4010, percentile ranking 4020, EHI score 4030, organizational effectiveness subscore 4040, content effectiveness subscore 4050, employee effectiveness subscore 4060 are displayed. In some examples, each column header may be selectable to enable sorting or reverse sorting based upon the company name (e.g., alphabetically), the percentile ranking, EHI score, organizational effectiveness subscore, content effectiveness subscore, and employee effectiveness subscore.

In some examples, the user may click on a score and be presented with a detailed view that shows the measurements behind the score or subscore. FIG. 5 shows an example detailed view GUI 5000 according to some examples of the present disclosure. This GUI is a detailed view of the employee effectiveness subscore. It shows a table with the component measurements of the employee effectiveness subscore 5010 of a particular organization, the status of those measurements 5020 and action items based upon those measurements 5030. In some examples, the action items may be selectable by a user and may lead to deep-dive views to look at details about the measurements.

Figure 6:
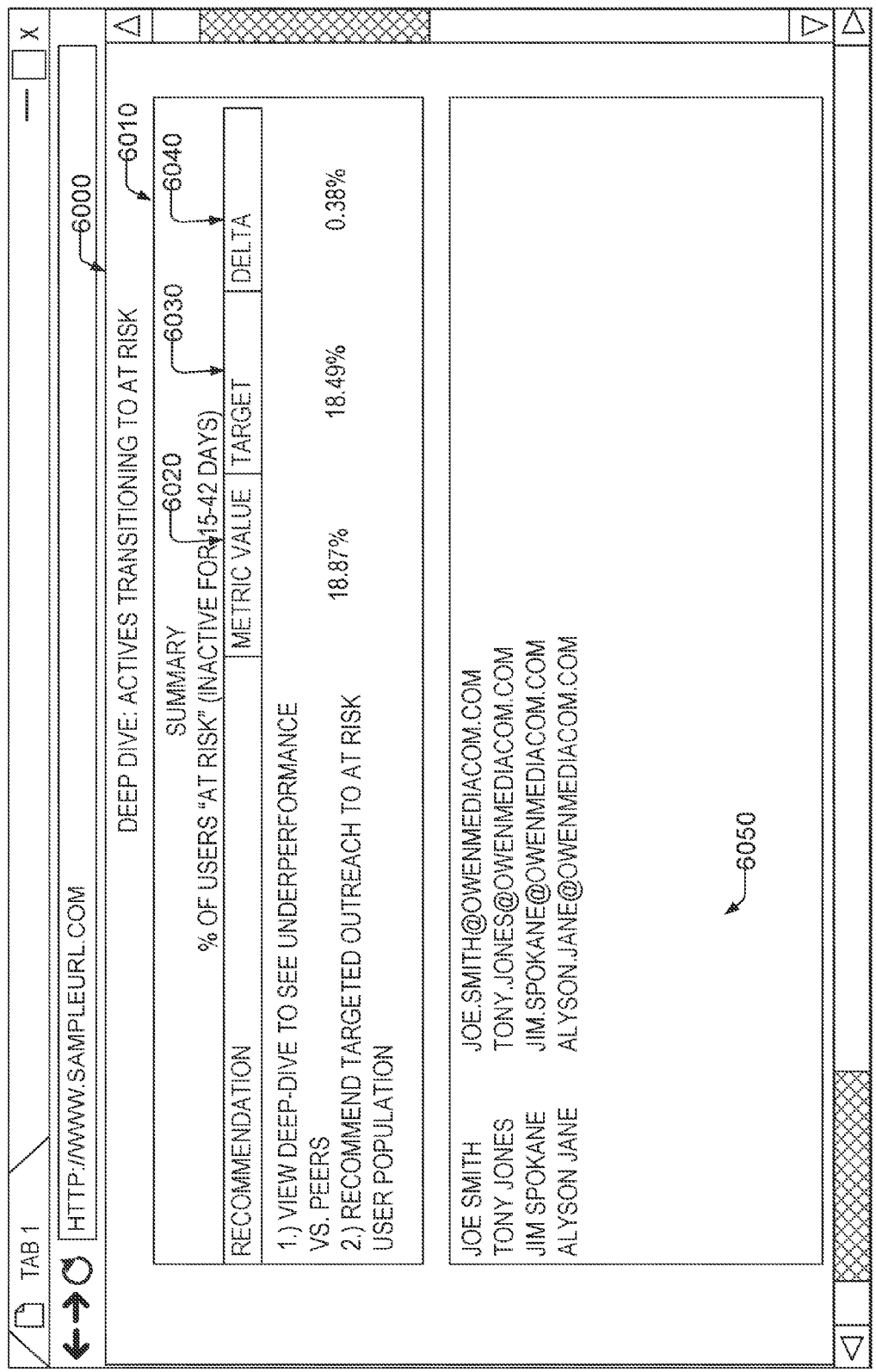
FIG. 6 is a deep dive GUI according to some examples of the present disclosure.

One example, deep dive GUI 6000 is shown in FIG. 6 according to some examples of the present disclosure. In some examples, the deep dive may show a more detailed view of how the measurement is calculated and some underlying information about the measurement. In FIG. 6 the measurement is the % of users that are active but transition to at risk. The deep dive GUI 6000 may have a summary panel 6010 which shows the value of the measurement 6020 for the organization, the value of the target 6030, and the difference between the value of the measurement 6020 and the target 6030 at 6040 ("delta").

Information panel 6050 may show one or more details about the measurements. In the example of FIG. 6, a list of users and their email addresses that have moved from active users to "at-risk" users are listed. This allows the user to contact these individuals to encourage them to participate in the system.

Figure 7:
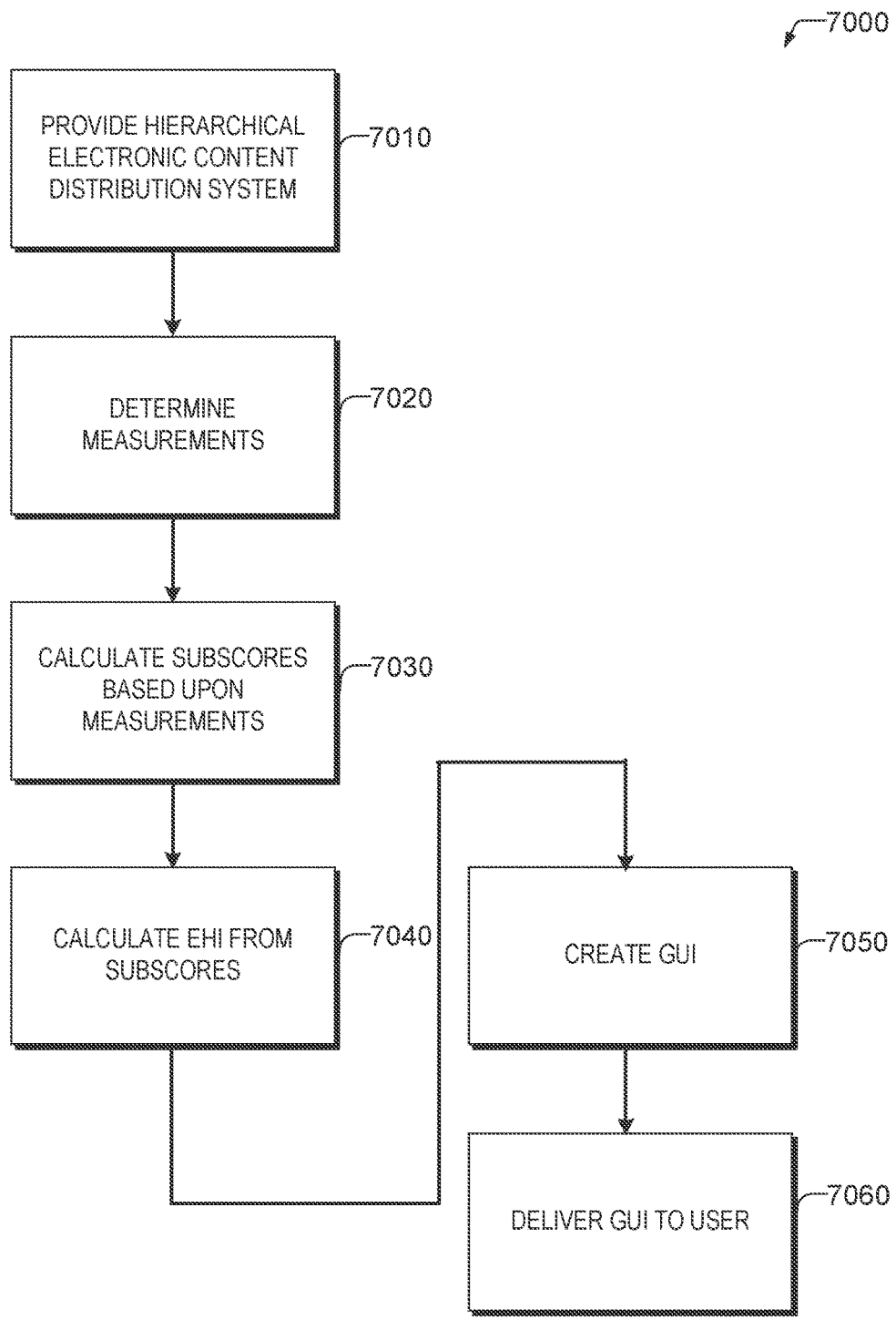
FIG. 7 is a flowchart of a method of providing performance information for a hierarchical electronic content distribution system according to some examples of the present disclosure.

Turning now to FIG. 7, a flowchart of an example method 7000 of providing performance information for a hierarchical electronic content distribution system is shown according to some examples of the present disclosure. At operation 7010 the system (e.g., a social networking service) may provide the hierarchical electronic content distribution system. For example, the system may provide a first set of one or more graphical user interfaces that facilitate the creation of a plurality of hierarchical content networks. These GUIs may allow for the sharing, viewing and interacting with content on the hierarchical content networks as previously described. The GUIs may be provided as one or more dedicated applications on a user's computing device, or may be provided as one or more user interface descriptors (e.g., HTML, CSS, JavaScript, or other browser renderable file) that is rendered by a general purpose application (e.g., a browser).

At operation 7020 the system may determine one or more measurements. Measurements may quantify one or more attributes of an organization's performance using the hierarchical content distribution system. In some examples, each measurement may quantify a different attribute. For example, the system may analyze one or more of the hierarchical content networks created by an organization to determine a plurality of measurements describing the organization's performance on the hierarchical electronic content distribution system. For example, the system may determine a volume of content by examining the number of hierarchical content networks created by the organization. The system may determine which users received which content to determine the percentage of users receiving enough content and the percentage of users receiving no content by examining the nodes in the hierarchical content network graphs and comparing those nodes to lists of an organization's employees. Furthermore, the system may analyze the hierarchical content networks to determine which employees share and interact with content to determine share rates, engagements, viral engagements, and the like. Week over week measurements may be calculated by comparing this week's measurements with last week's measurements.

In some examples, the hierarchical electronic content distribution system tracks employee usage of the GUIs of the system. For example, the system may use this tracking data to calculate the percentage of employees who visit the GUI, dormant users, new dormant users, at-risk users, and the like. Week over Week measurements may be calculated by comparing this week's measurements with last week's measurements.

At operation 7030 the system may calculate one or more subscores based upon the given measurements. In some examples, subscores may utilize the same measurements, different measurements, or some of the same measurements and some different measurements. In some examples, as part of operation 7030, to determine the subscores, the performance system also calculates one or more target measurements based upon a statistical calculation of the value of the measurement of a group of organizations. The group may be selected based upon industry, geographic radius, size, and the like. The statistical calculation may be an average, a median, a mean, or the like. As noted previously, the subscores may be a weighted summation of one or more of the constituent measurements of the subscores. At operation 7040 the EHI score may be calculated. As also previously noted the EHI may be calculated as a weighted summation of the subscores.

At operation 7050 the system may create one or more new GUIs or modify one or more of the GUIs from operation 7010 and include one or more of the subscores and the healthscore in one or more of the new or modified GUIs. In some examples, these GUIs may be GUIs displayed in a dedicated application on a computing device of the user. In these examples, creating the GUI at operation 7050 may comprise assembling the data to send to the users computing device and delivering the GUI to the user at operation 7060 may comprise sending this data. For example, data including one or more of the EHI, subscores, and the like. This data may then be used by the dedicated application to complete and display a GUI. In other examples, these GUIs may be built and sent by the social networking service or hierarchical electronic content distribution system. For example, the GUIs may be one or more GUI descriptors that are renderable by a general purpose browser application on the user's computing device. At operation 7060 these descriptors may be sent to the computing device of the user.

Figure 8:
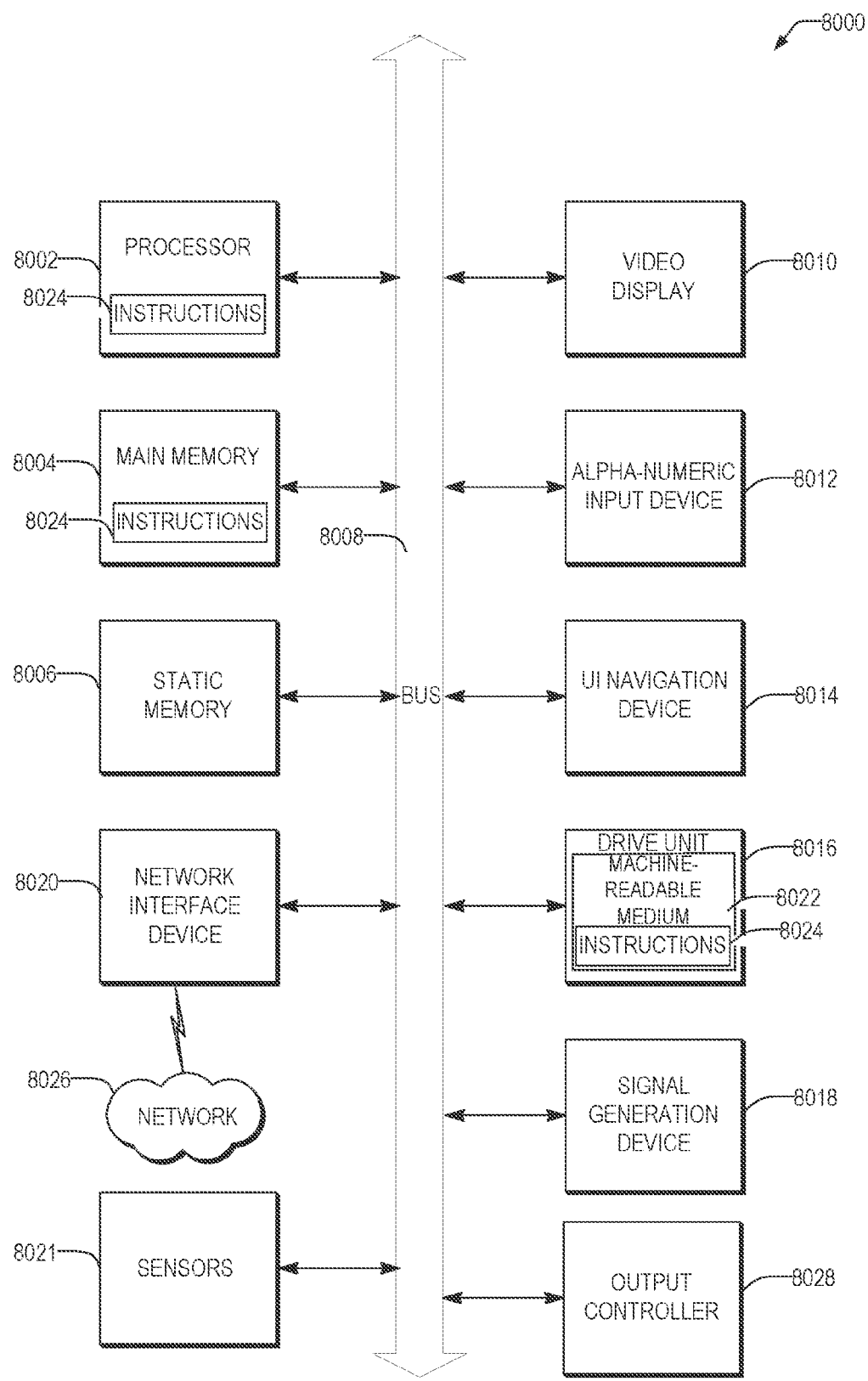
FIG. 8 is a block diagram illustrating an example of a machine upon which one or more embodiments may be implemented.

FIG. 8 illustrates a block diagram of an example machine 8000 upon which any one or more of the techniques (e.g., methodologies) discussed herein may perform. In alternative embodiments, the machine 8000 may operate as a standalone device or may be connected (e.g., networked) to other machines. In a networked deployment, the machine 8000 may operate in the capacity of a server machine, a client machine, or both in server-client network environments. In an example, the machine 8000 may act as a peer machine in peer-to-peer (P2P) (or other distributed) network environment. The machine 8000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. The machine 8000 (or components of the machine) may provide a social networking service, a performance system, or the like, such as shown in FIGS. 1 and 2 and perform a method such as shown in FIG. 7. Further, the machine may create or display GUIs such as FIGS. 3-6, such as a user's computing device. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 8000 may include a hardware processor 8002 (e.g., a central processing unit (CPU), a graphics processing unit (GPU), a hardware processor core, or any combination thereof), a main memory 8004 and a static memory 8006, some or all of which may communicate with each other via an interlink (e.g., bus) 8008. The machine 8000 may further include a display unit 8010, an alphanumeric input device 8012 (e.g., a keyboard), and a user interface (UI) navigation device 8014 (e.g., a mouse). In an example, the display unit 8010, input device 8012 and UI navigation device 8014 may be a touch screen display. The machine 8000 may additionally include a storage device (e.g., drive unit) 8016, a signal generation device 8018 (e.g., a speaker), a network interface device 8020, and one or more sensors 8021, such as a global positioning system (GPS) sensor, compass, accelerometer, or other sensor. The machine 8000 may include an output controller 8028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 8016 may include a machine readable medium 8022 on which is stored one or more sets of data structures or instructions 8024 (e.g., software) embodying or utilized by any one or more of the techniques or functions described herein. The instructions 8024 may also reside, completely or at least partially, within the main memory 8004, within static memory 8006, or within the hardware processor 8002 during execution thereof by the machine 8000. In an example, one or any combination of the hardware processor 8002, the main memory 8004, the static memory 8006, or the storage device 8016 may constitute machine readable media.

While the machine readable medium 8022 is illustrated as a single medium, the term "machine readable medium" may include a single medium or multiple media (e.g., a centralized or distributed database, and/or associated caches and servers) configured to store the one or more instructions 8024.

The term "machine readable medium" may include any medium that is capable of storing, encoding, or carrying instructions for execution by the machine 8000 and that cause the machine 8000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 8024 may further be transmitted or received over a communications network 8026 using a transmission medium via the network interface device 8020. The Machine 8000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 8020 may include one or more physical jacks (e.g., Ethernet, coaxial, or phone jacks) or one or more antennas to connect to the communications network 8026. In an example, the network interface device 8020 may include a plurality of antennas to wirelessly communicate using at least one of single-input multiple-output (SIMO), multiple-input multiple-output (MIMO), or multiple-input single-output (MISO) techniques. In some examples, the network interface device 8020 may wirelessly communicate using Multiple User MIMO techniques.

What is claimed is:

1. A method comprising:
using one or more computer processors:
providing a hierarchical electronic content distribution system for an organization including providing a first set of one or more graphical user interfaces to facilitate creation of a plurality of hierarchical content networks;
analyzing the plurality of hierarchical content networks to determine a first and second set of measurements of an organization's content sharing performance using the hierarchical electronic content distribution system, the second set of measurements measuring different attributes of the organization's content sharing performance than the first set of measurements;
calculating a first subscore from the first set of measurements, wherein the first subscore is based on a total number of users which received content corresponding to one of the plurality of hierarchical content networks over a predetermined period of time;
calculating a second subscore from the second set of measurements, wherein the second subscore is based on a total number of users which shared content corresponding to one of the plurality of hierarchical content networks over the predetermined period of time;
calculating a health score based upon the first and second subscores, wherein the health score indicates an outreach performance of the organization for using the hierarchical electronic content distribution system;
creating a second set of one or more GUIs, one or more of the GUIs in the second set including the first subscore, the second subscore, and the health score; and
delivering at least one GUI in the second set of GUIs, over a network, to a user.

2. The method of claim 1, wherein calculating the health score based upon the first and second subscores comprises calculating a weighted sum of the first and second subscores.

3. The method of claim 1, wherein calculating the first subscore from the first set of measurements comprises calculating a weighted sum of the first set of measurements.

4. The method of claim 1, further comprising:
receiving an input from a user selecting the first subscore; and
responsive to receiving the input from the user, displaying the first set of measurements.

5. The method of claim 4, further comprising:
displaying a set of recommendations for improving one or more of the first set of measurements.

6. The method of claim 1, wherein the first subscore indicates an organizational effectiveness at creating the plurality of hierarchical content networks.

7. The method of claim 1, wherein the second subscore indicates an effectiveness of content sent to other users by the organization through the plurality of hierarchical content networks.

8. The method of claim 1, further comprising calculating a third subscore, the third. subscore indicating a participating level of employees of the organization, the calculating the health score comprising calculating a weighted sum of the first, second, and third subscores.

9. A system comprising:

a processor;

memory comprising instructions, which when performed by the processor, cause the processor to perform operations to:

provide a hierarchical electronic content distribution system for an organization including providing a first set of one or more graphical user interfaces to facilitate creation of a plurality of hierarchical content networks;

analyze the plurality of hierarchical content networks to determine a first and second set of measurements of an organization's content sharing performance using the hierarchical electronic content distribution system, the second set of measurements measuring different attributes of the organization's content sharing performance than the first set of measurements;

calculate a first subscore from the first set of measurements, wherein the first subscore is based on a total number of users which received content corresponding to one of the plurality of hierarchical content networks over a predetermined period of time;

calculate a second subscore from the second set of measurements, wherein the second subscore is based on a total number of users which shared content corresponding to one of the plurality of hierarchical content networks over the predetermined period of time;

calculate a health score based upon the first and second subscores, wherein the health score indicates an outreach performance of the organization for using the hierarchical electronic content distribution system;

create a second set of one or more GUIs, one or more of the GUIs in the second set including the first subscore, the second subscore, and the health score; and deliver at least one GUI in the second set of GUIs, over a network, to a user.

10. The system of claim 9, wherein the operations to calculate the health score based upon the first and second subscores comprises operations to calculate a weighted sum of the first and second subscores.

11. The system of claim 9, wherein the operations to calculate the first subscore from the first set of measurements comprises operations to calculate a weighted sum of the first set of measurements.

12. The system of claim 9, wherein the instructions comprise instructions to cause the processor to perform operations to:

receive an input from a user selecting the first subscore; and responsive to receiving the input from the user, display the first set of measurements.

13. The system of claim 12, wherein the instructions comprise instructions to cause the processor to perform operations to:

display a set of recommendations for improving one or more of the first set of measurements.

14. The system of claim 9, wherein the instructions comprise instructions to cause the processor to perform operations to: calculate a third subscore, the third subscore indicating a participating level of employees of the organization, the operations of calculating the health score comprising operations to calculate a weighted sum of the first, second, and third subscores.

15. A non-transitory machine-readable medium, comprising instructions, which when performed by a machine, cause the machine to perform operations comprising:

providing a hierarchical electronic content distribution system for an organization including providing a first set of one or more graphical user interfaces to facilitate creation of a plurality of hierarchical content networks;

analyzing the plurality of hierarchical content networks to determine a first and second set of measurements of an organization's content sharing performance using the hierarchical electronic content distribution system, the second set of measurements measuring different attributes of the organization's content sharing performance than the first set of measurements;

calculating a first subscore from the first set of measurements, wherein the first subscore is based on a total number of users which received content corresponding to one of the plurality of hierarchical content networks over a predetermined period of time;

calculating a second subscore from the second set of measurements, wherein the second subscore is based on a total number of users which shared content corresponding to one of the plurality of hierarchical content networks over the predetermined period of time;

calculating a health score based upon the first and second subscores, wherein the health score indicates an outreach performance of the organization for using the hierarchical electronic content distribution system;

creating a second set of one or more GUIs, one or more of the GUIs in the second set including the first subscore, the second subscore, and the health score; and delivering at least one GUI in the second set of GUIs, over a network, to a user.

16. The machine-readable medium of claim 15, wherein the operations of calculating the health score based upon the first and second subscores comprises the operations of calculating a weighted sum of the first and second subscores.

17. The machine-readable medium of claim 15, wherein the operations of calculating the first subscore from the first set of measurements comprises the operations of calculating a weighted sum of the first set of measurements.

18. The machine-readable medium of claim 15, wherein the operations further comprise:

receiving an input from a user selecting the first subscore; and responsive to receiving the input from the user, displaying the first set of measurements.

* * * * *

UNITED STATES PATENT AND TRADEMARK OFFICE
CERTIFICATE OF CORRECTION

PATENT NO. : 10,361,988 B2
APPLICATION NO. : 15/231585
DATED : July 23, 2019
INVENTOR(S) : Levy et al.

Page 1 of 1

It is certified that error appears in the above-identified patent and that said Letters Patent is hereby corrected as shown below:

In the Claims

In Column 18, Line 64, in Claim 8, delete "third." and insert --third-- therefor In Column 19, Line 55, in Claim 12, delete "di splay" and insert --display-- therefor Signed and Sealed this
Seventeenth Day of March, 2020

Andrei Iancu
*Director of the United States Patent and Trademark Office*